United States Patent [19]

Pohl et al.

[11] Patent Number: 5,689,397

[45] Date of Patent: Nov. 18, 1997

[54] ARRANGEMENT FOR DISCONNECTING BRANCHES OF A LOW VOLTAGE SUPPLY NETWORK UNDER SHORT CIRCUIT CONDITIONS

[75] Inventors: Fritz Pohl, Hemhofen; Wilfried Jaehner, Nürnberg, both of Germany

[73] Assignee: Siemens Aktiengesellschaft, Munich, Germany

[21] Appl. No.: 525,676

[22] PCT Filed: Mar. 17, 1994

[86] PCT No.: PCT/DE94/00296

§ 371 Date: Sep. 25, 1995

§ 102(e) Date: Sep. 25, 1995

[87] PCT Pub. No.: WO94/22197

PCT Pub. Date: Sep. 29, 1994

[30] Foreign Application Priority Data

Mar. 25, 1993 [DE] Germany ................. 43 09 794.4

[51] Int. Cl.$^6$ ............................................. H02H 3/00
[52] U.S. Cl. ............................. 361/115; 361/93; 361/62
[58] Field of Search .............................. 361/8, 115, 93, 361/62, 13, 58, 64, 66

[56] References Cited

U.S. PATENT DOCUMENTS

| 2,924,752 | 2/1960 | Scott, Jr. ......................... 317/11 |
| 3,864,604 | 2/1975 | Pfanzelt ........................... 361/8 |

FOREIGN PATENT DOCUMENTS

| 0 504 463 | 9/1992 | European Pat. Off. ....... H01H 71/10 |
| 40 40 359 | 7/1992 | Germany ...................... H02H 3/08 |
| 41 10 335 | 10/1992 | Germany ...................... H02H 3/08 |

Primary Examiner—Jeffrey A. Gaffin
Assistant Examiner—Stephen Jackson
Attorney, Agent, or Firm—Kenyon & Kenyon

[57] ABSTRACT

A single circuit-breaker is provided in the phase conductor, and the bridging circuit is provided on the load side of the single circuit-breaker, and a magnetically driven switching contact closes a bridging current branch leading to the neutral conductor. The bridging circuit conducts a part of the short-circuit current past the magnetic drive and/or the switching contact. A resistor whose resistance value amounts to between 25 and 50% of the value of the smallest load-circuit impedance ($L_2$, $R_2$) to be expected, may be provided in the bridging current branch. In such an arrangement, the bridging circuit and the circuit-breaker can form one unit.

12 Claims, 3 Drawing Sheets

ARRANGEMENT FOR DISCONNECTING BRANCHES OF A LOW VOLTAGE SUPPLY NETWORK UNDER SHORT CIRCUIT CONDITIONS

BACKGROUND OF THE INVENTION

The present invention relates generally to apparatuses for disconnecting branches of a low voltage supply network under short circuit conditions, and more particularly to an apparatus for disconnecting branches of a low voltage supply network under short circuit conditions, in which power consumers are connected in the branch to phase conductors and to a corresponding neutral conductor, a switching element is connected in the incoming circuit to the consumer in order to switch it on and/or off, and switching elements for short-circuit breaking being provided in the phase conductor and/or the neutral conductor, to which switching elements a bridging circuit with a switching contact is connected, and in which a single circuit-breaker is also provided in the phase conductor.

Usually current-limiting circuit-breakers or line safety switches are used for the short-circuit protection of low voltage branches. The switching devices limit the pass-through currents to typically ⅓ to ½ of the current amplitude of the prospective short-circuit current. However, sensitive electrical devices, such as contactors or relays, are not able to tolerate the short-circuit effects of such high pass-through currents. Thus, grounding contacts or relay contacts may open dynamically in response to electrodynamic forces at high currents and become welded together when they close again as a result of contact fusing caused by arcs.

Various possibilities for limiting the effects of short circuits on the load side of protective devices by bridging a low-voltage branch are already well known in the art. For example, German A-40 40 359 describes a hybrid bridging device, which limits the Joulean heat integral to about 1/20 of the value of current-limiting line safety switches on the load side of the protective circuit. This very high protective action is necessary when using semiconductor switches in low-voltage branches, for example to control consumers, since overload currents of a short duration must not exceed ten times the value of the rated current in order not to destroy the semiconductor. However, this requires considerable outlay for equipment, since the hybrid bridging device needs a semiconductor switch with a higher rated current and a current-detecting and driving device. In addition, EP-A-0 504 463 proposes bridging low-voltage branches, where the circuit-breaker is provided with a tap of the arc chute and the switching arc starts up the bridging. In this case, the short-circuit protection depends on the operating speed of the switch mechanism and on the transit speed of the switching arc. Therefore, only a relatively small reduction in the Joulean heat integral is achieved on the load side of the protective device, which amounts more or less to half of the pass-through Joulean heat integral.

Furthermore, German A-41 10 335 discloses a device for short-circuit protection, in which is connected a semiconductor switch in incoming circuit to the sensitive consumer, and the semiconductor switch connected in series to a mechanical switch and contains a bridging branch circuit leading to the neutral conductor. The bridging branch circuit is thereby provided with a bridging switch, which is switched on instantaneously by the short-circuit current and bridges the consumer and an additional circuit-breaker. By this means, the consumer and the sensitive semiconductor switch are removed from load, it being necessary in any case for line safety switches to be present in the phase conductor and in the neutral conductor, which entails additional expenditure.

In addition, U.S. Pat. No. 2,924,752 discloses an arrangement for disconnecting three-phase low-voltage supply networks using a three-pole circuit breaker, in which a bridging circuit with a bridging current branch is provided, by way of which a part of the short-circuit current is conducted past the magnetic drive via switching contacts. Due to the special design of the bridging current branch, this arrangement is intended exclusively for multipole networks.

The present invention is therefore directed to an apparatus for providing short-circuit protection, which will greatly limit the short-circuit current and the short-circuit duration in sensitive electrical devices, and which will have a simpler construction.

SUMMARY OF THE INVENTION

The present invention solves this problem by providing only one single circuit-breaker in the phase conductor, and by disposing the bridging circuit on the load side of the single circuit-breaker, and by providing a magnetically driven switching contact closing a bridging current branch leading to the neutral conductor. The bridging current branch has a resistor whose resistance value amounts to between 25% and 50% of the value of the smallest load-circuit impedance to be expected. Preferably, the bridging circuit conducts part of the short-circuit current through the switching contact.

Thus, the arrangement according to the present invention is simplified compared to existing prior art arrangements. A bridging contact is present, through which the short-circuiting current is directed to the neutral conductor, without an additional switch being required; the resistor, whose resistance value amounts to about ¼ to ½ of the value of the smallest load-circuit impedance to be expected, being provided to limit the short-circuiting current in the bridging branch. The circuit-breaker and the bridging branch can advantageously form one unit.

DETAILED DESCRIPTION

Figure 1:
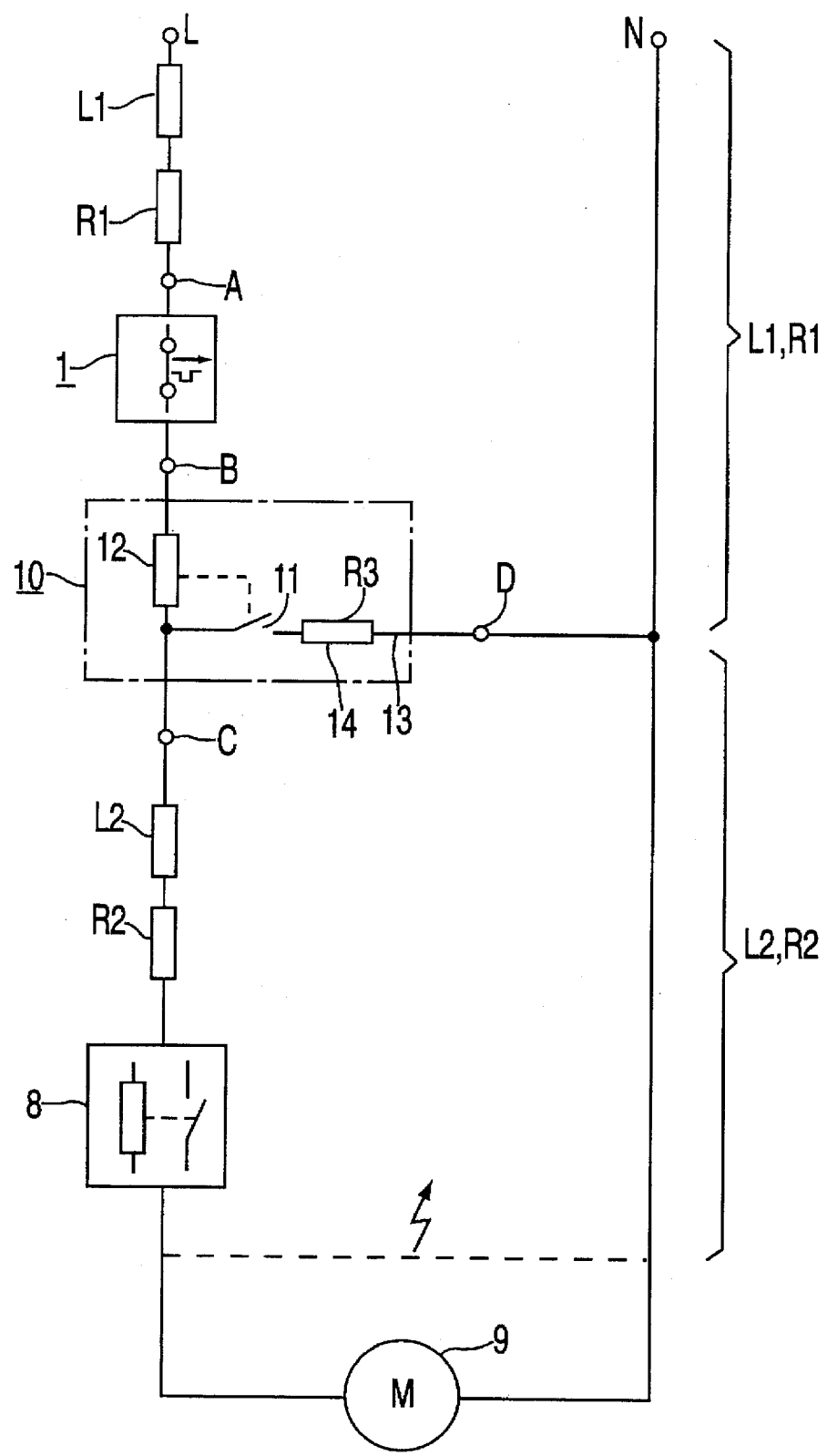
FIG. 1 depicts a circuit diagram of an example of a bridging circuit according to an embodiment of the present invention.

FIG. 1 shows a single-phase electrical network having an impedance $L_1$, $R_1$ on the incoming supply side of a circuit-breaker 1, which, on the load side, has a bridging circuit 10, as well as a short-circuit impedance $L_2$, $R_2$, which leads to a sensitive system part formed by a contactor 8 and a consumer 9, e.g., a motor.

Connected up on the load side of the circuit-breaker 1 comprising the connecting points A and B, is a bridging circuit 10, which has a switch 11 constituting the actual bridging contact, a corresponding magnetic drive 12, and a bridging current branch 13 comprising the resistor 14. In this case, the bridging current branch 13 is connected to point D, the bridging circuit 10 has the connecting point C leading to the contactor 8, and has the connecting point D connected to the neutral conductor.

A circuit arrangement of this type can also be designed for multiphase wiring systems, so that a multipole monitoring circuit is used.

Based on the example of a line protection for 16 A rated current, considering the configuration of FIG. 1, the magnetic drive of the bridging device can be so rated that, given dead short-circuits of $I_{prosp.}$ of 3 to 6 kA, response times of about 1.2 to 0.8 ms are reached for the magnetic drive. The rapid removal of load from the load circuit by means of the bridging circuit 10 leads in this case to a $I^2.t$ load, which now amounts to about ⅕ to ⅒ of the pass-through $I_2.t$ value of the line safety switch.

In FIGS. 2 through 5, the circuit-breaker 1 is comprised of an arc chute with arc chute plates 3 and slide rails 4, a corresponding switch 5, a thermal trip element 6 and a magnetic drive 7. The broken line indicates the common protective device formed by integrating the circuit-breaker 1 and the bridging device 10.

Figure 2:
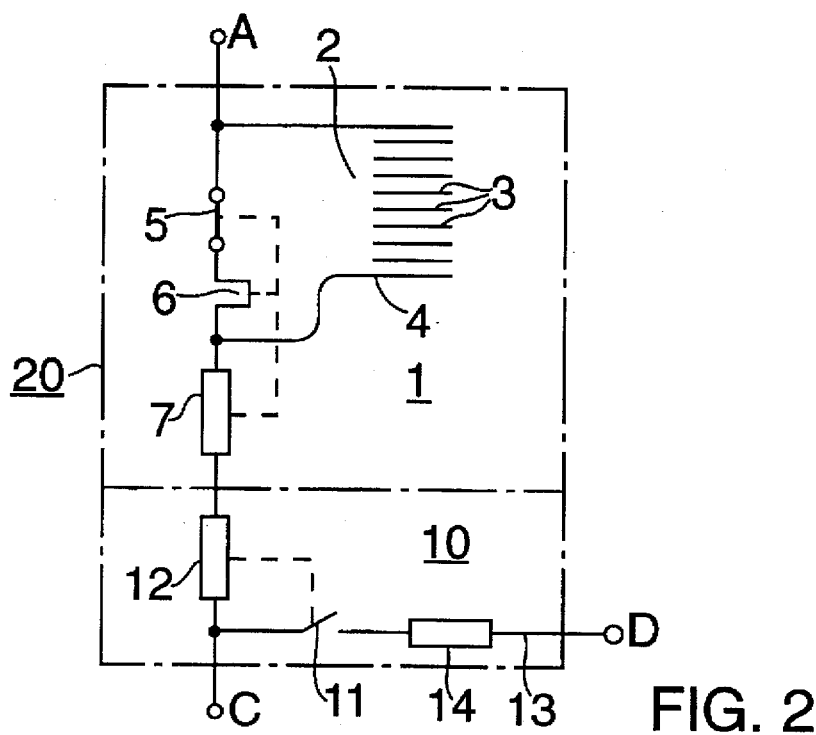
FIG. 2 depicts a circuit diagram of a common protection device formed by integrating the circuit-breaker and the bridging device.

In FIG. 2, after the bridging current branch is brought into circuit, the magnetic coil 7 of the trip element 6 and the magnetic coil 12 of the bridging device 10 continue to carry current until the short-circuit current on the power supply side becomes zero. A current separation corresponding to the impedance ratio of $R_3$ to $R_2$, $L_2$ takes place between the bridging current branch and the load circuit. At very large time constants $L_2/(R_2+R_3)$, a load current can still flow, although the supply-side short-circuit current is interrupted. In this case, the bridging contact 11 opens and the switching voltage accelerates the decay of the load current.

Figure 3:
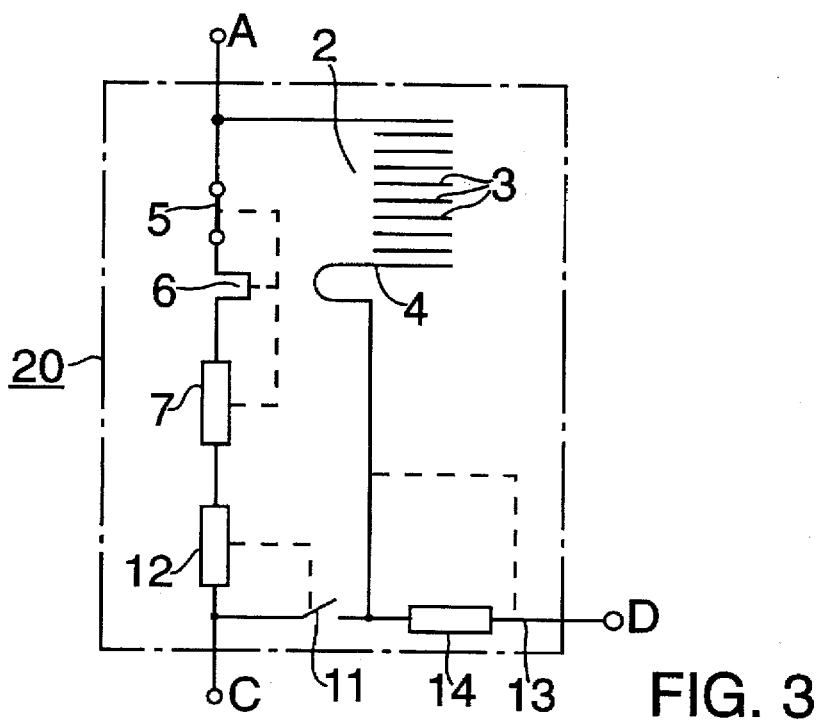
FIG. 3 shows a circuit diagram of another embodiment of FIG. 2 illustrating different connecting points for the slide rails.

FIG. 3 indicates another embodiment of FIG. 2 in which the connecting points of the slide rails 4 permit the arc chute 2 to bridge the circuit-breaker contact 5, the thermal trip element 6, and the magnetic trip element 7, as well as the magnetic drive 12 and the corresponding switch 11. After commutation of the arc into the arc chute 2, the magnetic drive 12 of the bridging device 10, inter alia, becomes currentless and the switch 11, with its switching voltage, interrupts the load current relatively early.

In the embodiment illustrated in FIG. 2, the switching contact of the switch 11 normally switches free of arcs. However, in the bridging device of FIG. 3, an arc loading occurs at the switching contact of switch 11, which has to be taken into consideration when designing the contact members used here.

Figure 4:
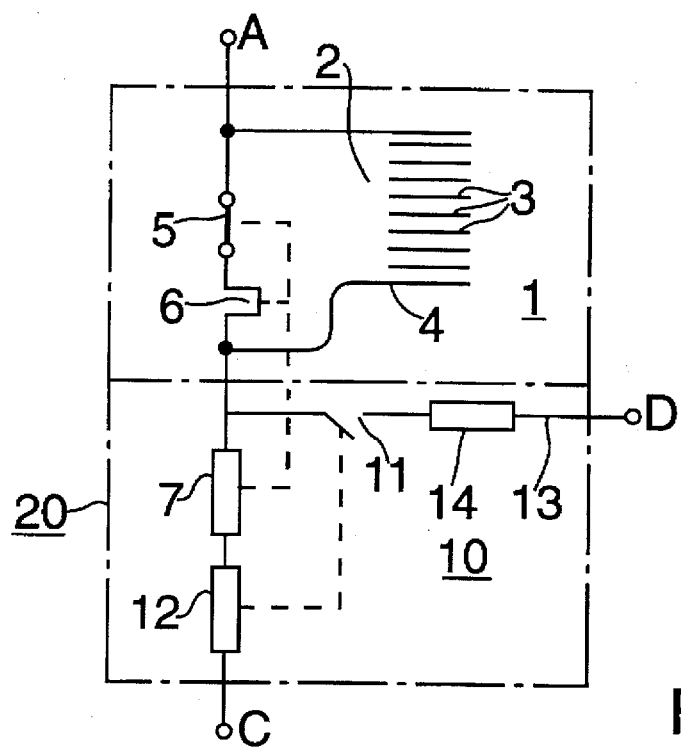
FIG. 4 shows a circuit diagram of another embodiment of FIG. 2 in which the magnetic drives are configured in the load circuit.
Figure 5:
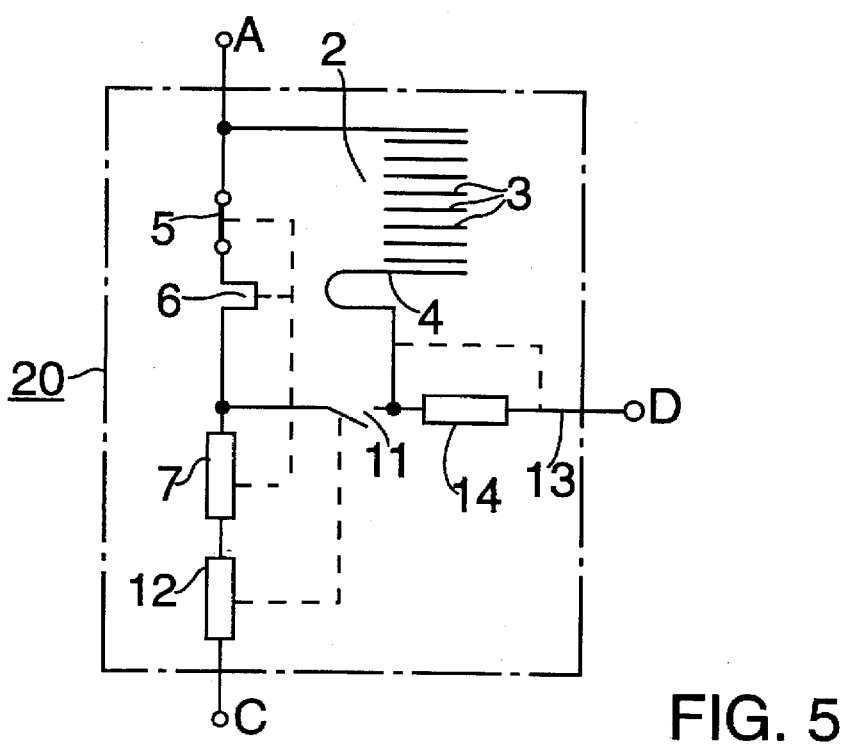
FIG. 5 depicts a circuit diagram of another embodiment of FIG. 3 in which the magnetic drives are configured in the load circuit.

FIGS. 4 and 5 illustrate an embodiment in which the protective devices differ from those of FIGS. 2 and 3 essentially in that the magnetic drives 7 and 12 are configured in the load circuit instead of in the supply circuit. To this end, the magnetic drives 7 and 12 no longer need to be rated for full short-circuit loading.

For that reason, the arrangement according to FIG. 5 is especially advantageous, because after load is removed from the switch 11 as the result of electric arc commutation into the arc chute 2, its switching contact remains closed for as long as the magnetic excitation of the magnetic drives 7 and 12 persists due to the load current. Therefore, the switch 11 opens the switching contact free of electric arcs after the load current has decayed.

The examples depicted in FIGS. 2 through 5 can be modified in various details.

For example, the arrangement of the thermal trip element 6 can be placed between the terminal connection C and the connecting point of the bridging branch. The magnetic drives 7 and 12 can be replaced by a common magnetic drive for tripping and bridging. When the intent is for the bridging circuit to have a multipole design, the individual connections are connected to one another, respectively, and to the neutral conductor. In the case of an integrated structure as a multipole bridging switch, the connection of the terminal connections D take place in the unit.

In the case of the described arrangement, it is advantageous that contact members of weld-resistant contact materials are used for the switching contact of the switch 11. Possible materials for this are materials on a silver metal-oxide (AgMeO) base, such as the known $AgSnO_28$, or silver- or copper-graphite materials, such as, for example, AgC5 or CuC7. An asymmetrical contact pairing with different materials is also possible.

What is claimed is:

1. An apparatus for disconnecting branches of a low voltage supply network under short circuit conditions, wherein consumers are coupled in one branch to a phase conductor and to a corresponding neutral conductor, the apparatus comprising:

a switching element coupled in an incoming circuit to the consumer in order to switch the switching element to at least one of an on state and an off state;

a single circuit-breaker disposed in the phase conductor; and a bridging circuit positioned on a load side of the single circuit-breaker and disposed in at least one of the phase conductor and the neutral conductor, the bridging circuit including a first magnetic drive and a bridging switch, the bridging switch having a magnetically driven switching contact for closing a bridging current branch leading to the neutral conductor, the bridging current branch including a resistor having a resistance value between 25% and 50% of a value of a smallest expected load-circuit impedance, wherein the bridging current branch conducts a part of a short-circuiting current through the magnetically driven switching contact in the bridging circuit so that the magnetically driven switching contact leading to the neutral conductor is closed.

2. An apparatus for disconnecting branches of a low voltage supply network under short circuit conditions, wherein consumers are coupled in one branch to a phase conductor and to a corresponding neutral conductor, the apparatus comprising:

a switching element coupled in an incoming circuit to the consumer in order to switch the switching element to at least one of an on state and an off state;

a single circuit-breaker disposed in the phase conductor; and a bridging circuit positioned on a load side of the single circuit-breaker and disposed in at least one of the phase conductor and the neutral conductor, the bridging circuit including a first magnetic drive and a bridging switch, the bridging switch having a magnetically driven switching contact for closing a bridging current branch leading to the neutral conductor, the bridging current branch including a resistor having a resistance value between 25% and 50% of a value of a smallest expected load-circuit impedance, wherein the bridging current branch conducts a part of a short-circuiting current through the magnetically driven switching contact in the bridging circuit so that the magnetically driven switching contact leading to the neutral conductor is closed, and wherein the circuit-breaker and the bridging circuit form one unit.

3. The apparatus according to claim 2, further comprising a second magnetic drive for the circuit-breaker, wherein both the first and second magnetic drives are situated in the load circuit.

4. The apparatus according to claim 2, wherein a common magnetic drive is provided for tripping the circuit-breaker and for switching on the bridging switch.

5. The apparatus according to claim 2, wherein the circuit-breaker further comprises an arc chute having slide rails, wherein the bridging current branch is coupled to the slide rails so that the thermal and the magnetic trip elements and the first magnetic drive are bridged via the arc chute of the circuit-breaker.

6. An apparatus for disconnecting branches of a low voltage supply network under short circuit conditions, wherein consumers are coupled in one branch to a phase conductor and to a corresponding neutral conductor, the apparatus comprising:

a switching element coupled in an incoming circuit to the consumer in order to switch the switching element to at least one of an on state and an off state;

a single circuit-breaker disposed in the phase conductor;

a bridging circuit positioned on a load side of the single circuit-breaker and disposed in at least one of the phase conductor and the neutral conductor, the bridging circuit including a first magnetic drive and a bridging switch, the bridging switch having a magnetically driven switching contact for closing a bridging current branch leading to the neutral conductor, the bridging current branch includes a resistor having a resistance value between 25% and 50% of a value of a smallest expected load-circuit impedance; and a thermal trip element for the circuit-breaker, the thermal trip element being disposed on the load side of the bridging current branch, wherein the bridging current branch conducts a part of a short-circuiting current through the magnetically driven switching contact in the bridging circuit so that the magnetically driven switching contact leading to the neutral conductor is closed.

7. The apparatus according to claim 6, wherein the circuit-breaker further comprises an arc chute having slide rails, wherein the bridging current branch is coupled to the slide rails so that the thermal and the magnetic trip elements and the magnetic drive are bridged via the arc chute of the circuit-breaker.

8. An apparatus for disconnecting branches of a low voltage supply network under short circuit conditions, wherein consumers are coupled in one branch to a phase conductor and to a corresponding neutral conductor, the apparatus comprising:

a switching element coupled in an incoming circuit to the consumer in order to switch the switching element to at least one of an on state and an off state;

a single circuit-breaker disposed in the phase conductor; and a bridging circuit positioned on a load side of the single circuit-breaker and being disposed in at least one of the phase conductor and the neutral conductor, the bridging circuit including a first magnetic drive and a bridging switch, the bridging switch having a magnetically driven switching contact for closing a bridging current branch leading to the neutral conductor, the bridging current branch including a resistor having a resistance value between 25% and 50% of a value of a smallest expected load-circuit impedance, wherein the bridging current branch conducts a part of a short-circuiting current through the magnetically driven switching contact in the bridging circuit so that the magnetically driven switching contact leading to the neutral conductor is closed, and wherein the switching contact of the magnetically driven switch of the bridge circuit is made of weld-resistant contact materials.

9. The apparatus according to claim 8, further comprising a plurality of connectors for coupling to the low voltage supply network, wherein said plurality of connectors are asymmetrically paired.

10. The apparatus according to claim 8, wherein the base for the weld-resistant contact materials is selected from the group of materials consisting of silver metal-oxide (AgMeO), silver-graphite (AgC) and copper-graphite (CuC).

11. The apparatus according to claim 10, further comprising a plurality of connectors for coupling to the low voltage supply network, wherein said plurality of connectors are asymmetrically paired.

12. A multipole bridging apparatus for multi-phase networks under short circuit conditions, wherein consumers are coupled in the branch to a phase conductor and to a corresponding neutral conductor, the multipole bridging apparatus comprising:

a switching element coupled in an incoming circuit to the consumer in order to switch the switching element to at least one of an on state and an off state;

a single multipole circuit-breaker disposed in the phase conductor; and a bridging circuit positioned on a load side of the single circuit-breaker and being disposed in at least one of the phase conductor and the neutral conductor, the bridging circuit including a first magnetic drive and a bridging switch, the bridging switch having a magnetically driven switching contact for closing a bridging current branch leading to the neutral conductor, the bridging current branch including a resistor having a resistance value between 25% and 50% of a value of a smallest expected load-circuit impedance wherein the bridging current branch conducts a part of a short-circuiting current through the magnetically driven switching contact in the bridging circuit so that the magnetically driven switching contact leading to at least one of a common point of the bridging current branch and the neutral conductor is closed.

* * * * *